Jan. 8, 1952     M. STROUKOFF ET AL     2,582,080
SPACE VECTOR ANALYZER

Filed Feb. 7, 1950     3 Sheets—Sheet 1

Inventors
Michael Stroukoff
and James E. Bartfield

Attorney

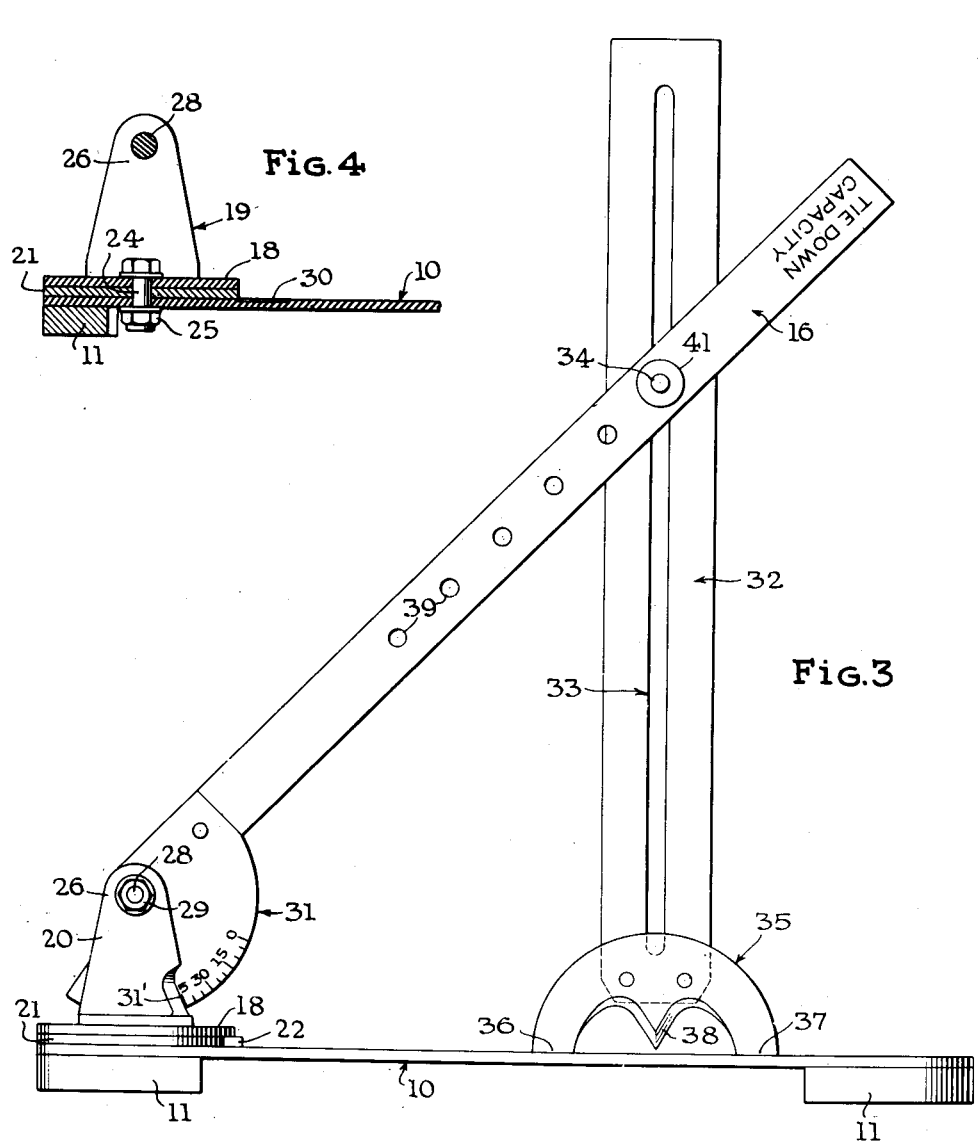

Patented Jan. 8, 1952

2,582,080

UNITED STATES PATENT OFFICE 2,582,080

SPACE VECTOR ANALYZER

Michael Stroukoff, Lawrenceville, and James E. Bartfield, Trenton, N. J., assignors to Chase Aircraft Company, Inc., West Trenton, N. J., a corporation of New York Application February 7, 1950, Serial No. 142,766

4 Claims. (Cl. 33—1)

Our invention relates to a mechanical, direct reading space vector analyzer which resolves any vector into its three components i. e. into its longitudinal, lateral and vertical components. Our device has many useful applications where quick and accurate determination of the components of space vectors is required. In particular, our device is especially adapted for resolving any obliquely applied load into its lateral, longitudinal and vertical components. An important practical application of our invention is the determination of the load components in cargo tie-down ropes or cables, used for securing loads on aircraft or ships. When used for this purpose, our device eliminates involved mathematical computations and thereby effects considerable saving in time and in the use of trained technical personnel. Above all, the use of our device reduces the possibility of error in the determination of the various load components and thereby insures security of the load from damage and also insures the aircraft or ship from damage by avoiding any possible shifting of the cargo against the walls thereof. For convenience in discussion, our device will be described with reference to its use in determining the components of loads in cargo tie-down ropes but, it is to be expressly understood that, the use of our device is not restricted to this particular application.

The construction of our device and its operation will be understood from the following detailed description when read in the light of the accompanying drawings in which:

Figure 3 is a side elevation, and

Figure 4 is a fragmentary sectional view of a detail.

Figure 1:
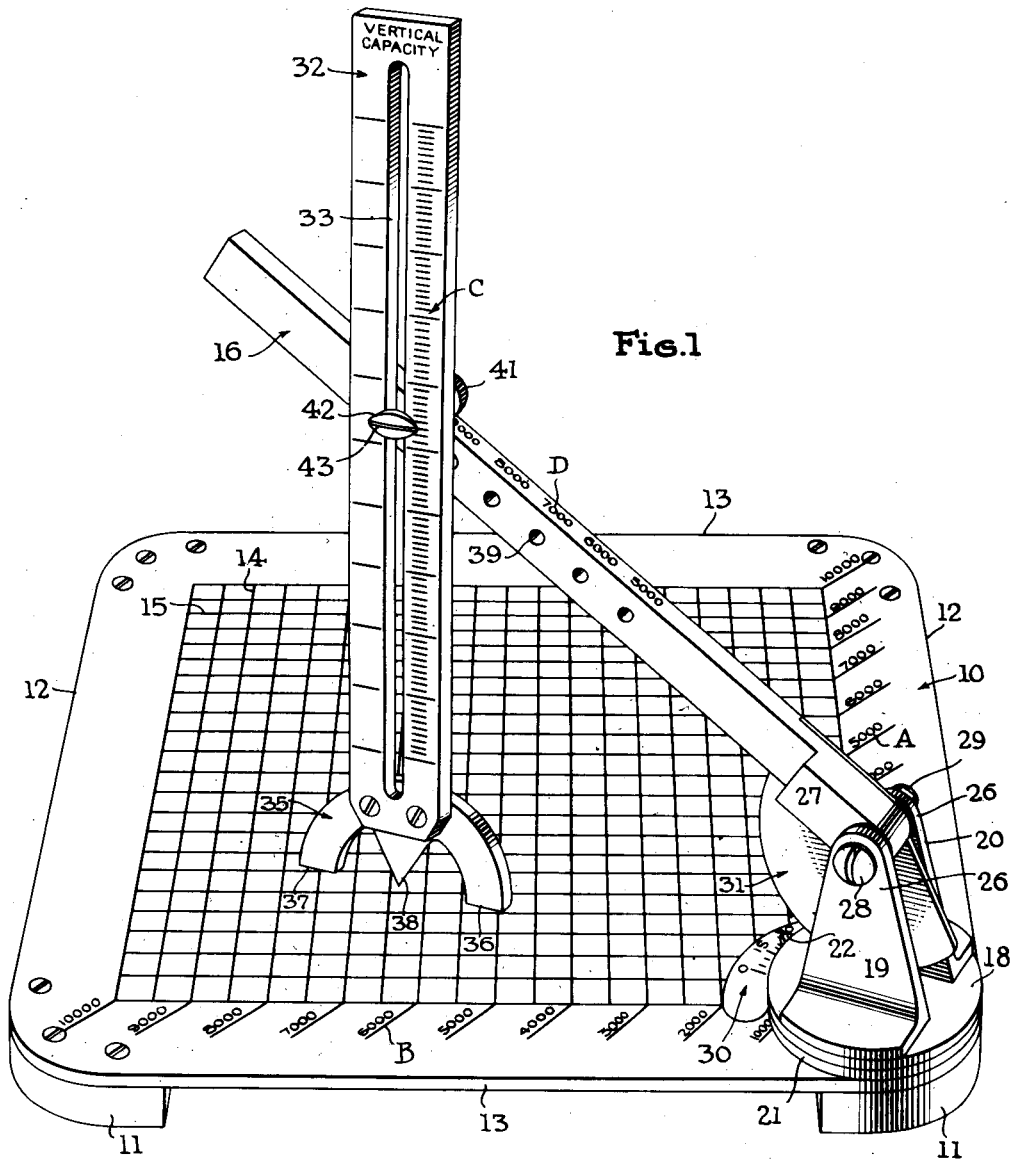
Figure 1 is a perspective view of the device in its operative position.

Referring to the drawings, the instrument comprises a generally rectangular shaped board or base member 10, made of a light metal or the like, provided at its respective corners with wooden supports 11, or other type legs if desired, which are secured to the base by any suitable fastening means e. g. screws. The base member 10 is provided with a horizontal top flat surface and parallel opposite edges, and the surface is marked with two series of lines 14, 15, respectively parallel to edges 12, 13 of the board and hence, perpendicular to each other. For convenience, the edges 12, 13 will hereafter be referred to as the lateral, and longitudinal edges of the board respectively. The intersecting lines 14, 15 on the top surface of the board constitute a grid and give to it the appearance of commonly used "graph" paper. The two adjacent sides 12, 13 of the board are marked with suitable series of graduations, constituting scales A, B, respectively, the particular graduations depending upon the use of the instrument. In the case under consideration, where the instrument is used for determining the load components of cargo tie-down ropes, the lateral and longitudinal edges 12, 13, respectively, will be calibrated in pounds, in units of suitable denomination e. g. 1000 pounds, from zero to 10,000 pounds. As will be explained in detail hereafter, these scales A, B, have a common zero point.

Disposed above the base is a hinged straight edge member 16, which is mounted for pivotal motion about both a horizontal and a vertical axis, which axes intersect. As will be apparent, these axes are respectively parallel and perpendicular to the top surface of the base 10.

The pivotal mount for the bar 16 comprises a centrally apertured circular bottom plate 18 (Fig. 4) carrying two parallel vertical right-angled brackets 19, 20. Rigidly secured to the lower surface of the plate 18 is a similar apertured circular plate 21 provided with a triangular projection 22 serving as a pointer, as will be described below. Further, the base member 10 is provided at one of its corners with an aperture corresponding to the aperture in the plates 18, and 21, the center line of the aperture in the base member coinciding with the common zero point of the A and B scales. A vertical bolt 24, or similar pivot or swivel connection, passes through the respective apertures in plates 18, 21 and in the base 10, as shown, the bolt being held in position by a nut 25. Further, each of the brackets 19, 20 is provided at upper end 26 with an aperture, and the lower thickened end 27 of the member 16 is provided with a corresponding aperture. In assembling the device, the end 27 is inserted in the space between the vertical brackets 19, 20 and is so positioned therein, that the front face of the member 16—indicated by an arrow in Figure 1—is disposed in a vertical plane midway between the brackets 19 and 20 and passes through the center line of bolt 24. The end 27 having been so disposed between the vertical brackets 19, 20, a bolt 28 which serves as a hinge, pivot or swivel joint, is passed through the apertures in the brackets 19, 20 and in the end 27, and is held in position by a nut 29. It is apparent, that in the described arrangement, the horizontally disposed bolt 28 acts as the horizontal hinge or pivot for the member 16 while the vertical bolt 24 acts as the vertical pivot. As above described, these bolts are so disposed that their axes intersect, and these axes are respectively parallel and perpendicular to the top surface of the base 10. As a result, the member 16 is capable of pivotal movement over the top surface of the base 10 or grid in both a horizontal and vertical plane.

Mounted in a recess in a corner of the top surface of the base 10 is a protractor scale 30, the center of which coincides with the vertical pivotal axis of the straight edge member 16 i. e. with the axis of the vertical bolt 24. The aforementioned pointer 22 on the plate 21 of the pivotal mount assembly for the member 16, cooperates with the scale 30 to give the angular displacement of the straight edge member 16 in the plane of the base or grid 10 i. e. in a horizontal plane. Similarly, the member 16 carries adjacent its pivoted end a protractor scale 31, having its center in the axis of the horizontal bolt or pivot 23. This scale cooperates with a stationary reference line, constituted by a sharp straight edge 31' on the bracket 20, to give the angular displacement of the member 16 from the plane of the base or grid 10, i. e. in a vertical plane.

Displaceably mounted on the pivoted member 16 is a vertical straight edge bar 32 having thereon a series of suitable calibration marks, constituting a scale C, as shown in Figure 1. This bar is provided at its center with a longitudinally extending slot 33, adapted to receive a guide stud or pin 34. Fastened to the lower end of the bar 32 is a semi-circular member 35, of a transparent plastic or other convenient material, the lower ends 36, 37 of which are flat and lie in a common plane and are adapted to rest on the top surface of the base or grid 10, as the bar 32 moves thereover in the use of the device. The lower central portion of the member 35 is shaped in the form of a pointer 38, the tip of which lies on a line passing through the center line of the slot 33 and in a plane coincident with the front face of member 16 referred to above. Hence, the tip of pointer 38, the front face of member 16 and the center line of pivot member 24 all lie in the same vertical plane. As shown in Figure 3 of the drawings, the end of the pointer 38 lies at a slight distance above the plane of the lower ends 36, 37 of the member 35 so that the tip of the pointer does not engage the top surface of the base 10 as the bar 32 is moved over the grid, thereby avoiding friction and damage to the pointer or grid.

Figure 2:
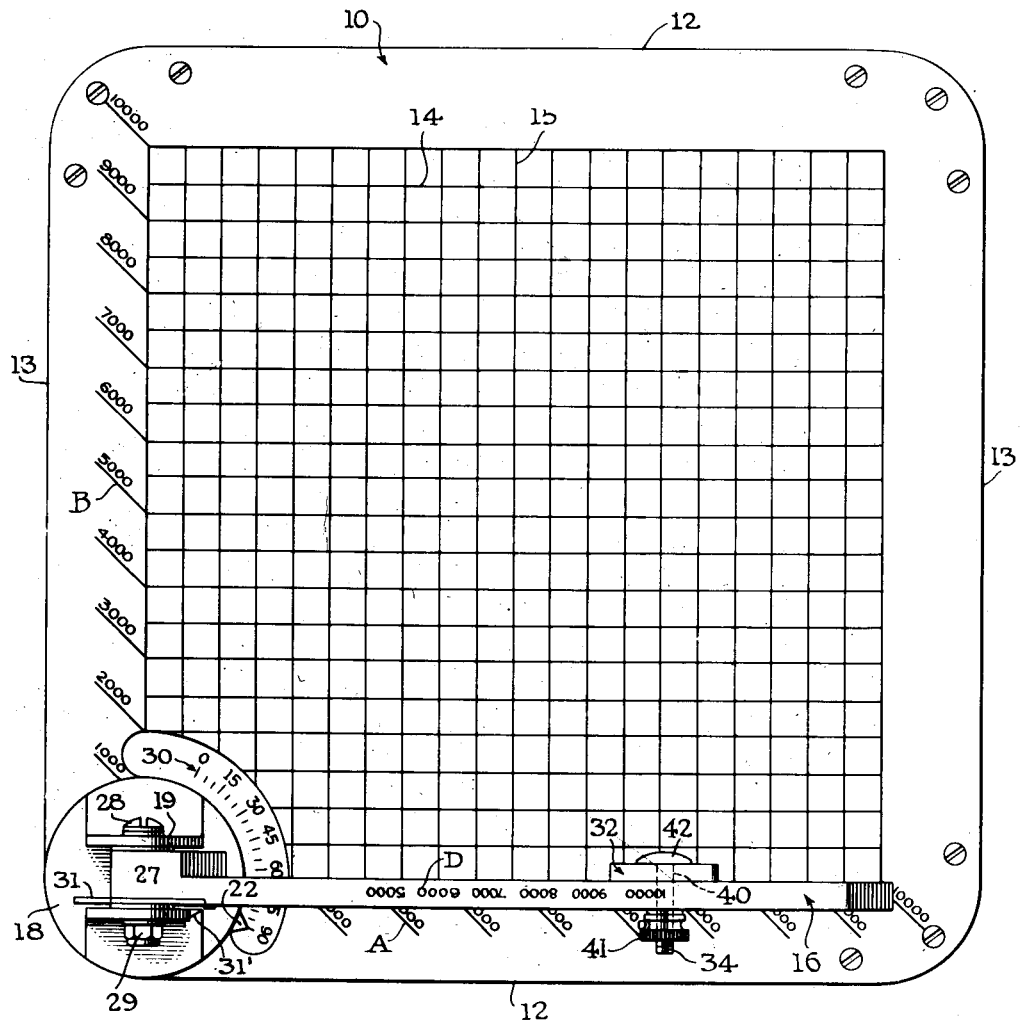
Figure 2 is a plan view of the same.

The straight edge member 16 is provided with a series of suitable graduation marks constituting a scale D, as shown in Figures 1 and 2. In the illustrated example of an instrument used for the determination of the load components in cargo tie-down ropes, the member 16 is provided with a series of drilled holes 39 corresponding in position to the scale markings for the reception of the guide pin 34 which, when the instrument is assembled ready for use, also passes through the slot 33 in the vertical bar 32, as shown in Figure 2. The portion 40 of the shank of the pin 34, passing through the slot 33 in the bar 32, is provided with flat sides which slidably engage and fit against the corresponding flat sides of the slot 33, so as to readily permit a sliding adjustment of the pin within the slot when the member 16 is moved in a vertical plane over the base 10 and the bar 32, associated therewith, also moves over the top surface of the base, with the flat ends 36, 37 resting on said surface and the bar 32 in a vertical position. A milled, threaded thumbpiece 41 serves to retain the bar in assembled adjusted position on the member 16. The guide pin 34 has a wide head 42 provided with a narrow horizontal slot 43 which serves as a reference line in obtaining readings on the scale C.

In the embodiment of the invention illustrated, which is particularly adapted as a tie-down load indicator, it is sufficient to provide for a number of definitely spaced positions of the guide pin 34 on the member 16, corresponding to the principal calibration marks on scale D. However, in other uses of the device, it may be desirable to permit an unlimited number of positions of the guide pin on the member 16. In that case, the member 16 will be provided with an elongated guide slot similar to the one formed in the bar 32 and the pin 34 will then be simultaneously guided in the respective slots of both member 16 and bar 32.

As heretofore indicated, the member 16 is capable of pivotal movement over the top surface of the base 10, or grid, in both a horizontal and a vertical plane. In this movement, the member 16 carries with it the vertical bar 32, and these two parts have such a sliding engagement by means of pin 34 and slot 33 that, with the thumbpiece 41 loosened, the bar 32 is at all times retained in a position perpendicular to the top surface of base 10 until the final desired position is reached. Then, the thumbpiece 41 is tightened to fix the bar 32 and member 16 in their final, relative, adjusted positions. The plate 21 has a frictional contact with the underlying portion of the surface of the base, so that the member 16 cannot be easily displaced—accidentally—from its adjusted position.

It may be observed that, when the instrument is assembled ready for use and the member 16 is disposed in a horizontal position with the tip of the pointer 38 on the zero line of the lateral or A scale, then, the reading on the vertical scale C is zero, as are also the readings on the protractors 30, 31, respectively.

As stated above, the instrument of our invention finds a practical, important application as a tie-down load computer in the air transport of freight. In this service, it provides a rapid and accurate means for resolving tie-down loads into their three main components, i. e. lateral, longitudinal and vertical, thus enabling a determination of the number and position of cargo tie-downs required to prevent shifting of cargo and resultant damage to the aircraft, and/or injury to personnel, in the event of a crash landing or flight in extremely turbulent air.

Normally, a cargo is tied down by ropes or cables rigged diagonally and attached to tie-down fittings which are secured on a grid pattern to the floor and other parts of the aircraft. It is seldom possible to rig the tie-downs i. e. the ropes or cables, directly fore and aft. For this reason, it is usually necessary to analyze each tie-down assembly in the three components of its load resistance. The method of analysis, using the instrument of our invention, will be set out in detail below. In the interest of simplicity of explanation, the following examples include fore, aft, side and diagonal tie-downs. The procedure in using our instrument in analyzing cargo tie-down loads is as follows:

1. Determine the forward, aft, vertical and side load capacities to be provided for, by multiplying the weight of the item of cargo by the desired factors.

*Example*

| | |
|---|---|
| Desired forward factor | 8.0 |
| Desired aft factor | 2.0 |
| Desired vertical factor | 4.5 |
| Desired side factor | 1.5 |

For a cargo item weighing 3000 pounds, the desired load capacity is computed as follows:

The capacity of the forward tie-downs must be 3000×8.0 or 24,000 lbs.
The capacity of the aft tie-downs must be 3000×2.0 or 6,000 lbs.
The capacity of the vertical tie-downs must be 3000×4.5 or 13,500 lbs.
The capacity of the side tie-downs must be 3000×1.5 or 4,500 lbs.

2. Determine the number of aircraft tie-down fittings to be used, by dividing the desired tie-down capacity in each direction by the capacity of each aircraft tie-down fitting.

*Example*

Given that each aircraft tie-down fitting has a load capacity of 10,000 pounds, then 24,000 lbs. desired forward load capacity divided by 10,000=2.4 or a minimum of 3 fittings required.
6,000 lbs. desired aft load capacity divided by 10,000=.6 or 1 fitting required.
13,500 lbs. desired vertical load capacity divided by 10,000=1.35 or 2 fittings required.
4,500 lbs. desired side load capacity divided by 10,000=.45 or 1 fitting required.

3. Check to be sure that the tie-down rope or cable capacity is equal to the capacity of the aircraft tie-downs, and that the cargo item weight does not exceed the load capacity of the floor.

4. Position the cargo item on the cargo floor.

5. Position the tie-down load indicator of this invention on the cargo floor just aft of the cargo item, with the supports 11 resting on the floor and with one side of the tie-down load indicator, the side 13, parallel with the center line of the aircraft, with the hinge of member 16 away from the cargo item, and bar 32 attached to member 16 at the hole beneath the calibration corresponding to the capacity of the tie-down fitting to be used.

*Example*

If the tie-down ring has a capacity of 10,000 pounds, then, the pin 34 should be inserted in the hole in member 16 beneath the "10,000" calibration mark on scale D.

6. Determine the minimum forward load capacity to be provided by each forward tie-down by dividing the desired forward load capacity by the number of tie-downs.

*Example*

24,000 lbs. desired forward load capacity divided by 3 tie-downs (as determined in paragraph 2) equals 8000 lbs load capacity to be provided by each tie-down; if additional tie-downs are used the minimum required load capacity would be lower.

7. With the thumbpiece 41 loosened, adjust the position on the top surface of the base 10 of the member 16 and associated bar 32—the latter being perpendicular to the top surface of the base 10 and its lower ends 36, 37 resting on said surface—so that the pointer tip 38 is over the 8000 pound grid line of scale B (Figure 2), i. e. the scale parallel to the center line of the aircraft. When the adjustment has been made, tighten the thumbpiece.

8. Read the vertical load capacity provided by the forward tie-downs on the calibration on bar 32 opposite the reference line 43.

Note.—The vertical components of the fore and aft and side tie-downs obviate the necessity of rigging tie-downs for the sole purpose of containing the vertical load.

9. Rig the tie-down ropes between attachment points on the cargo item and the tie-down rings in such a way, that the tie-down rope is parallel to the member 16 in its adjusted position as obtained according to step 7 above. If the available aircraft tie-down fittings are so located with reference to the position of the cargo item that the tie-down rope cannot parallel member 16, use the fitting which will position the tie-down rope at an angle as close to paralleling member 16 as possible, at a smaller angle to the cargo floor. After rigging the tie-down, check the load capacity as described below in "Analysis of load capacity of existing tie-downs."

*Aft tie-downs*

1. Position the tie-down load indicator forward of the cargo item, with the pivotal point of member 16 away from the cargo item and side 13 parallel to the center line of the aircraft.

2. Proceed as described in determining the forward tie-downs but, in step 7, reading the aft tie-down load capacity on the grid calibration paralleling the center line of the aircraft i. e. on scale B.

*Side tie-downs*

1. Position the tie-down load indicator to one side of the cargo item with one side i. e. side 13 parallel to the aircraft center line and the pivotal point of member 16 away from the cargo.

2. Proceed as described in determining forward tie-downs but, in step 7, reading the side load capacity on the base calibration paralleling the lateral axis of the aircraft i. e. on scale A.

*Diagonal tie-downs*

1. Proceed according to instructions in paragraphs 1 to 6 of operation for determining forward tie-downs.

2. Attach one end of a test cord to the cargo item attachment point, attach the other end to a convenient aircraft tie-down fitting.

3. Position the tie-down load indicator beneath the test cord, with the hinged end of member 16 positioned away from the cargo item, and one side—the side 13—of the tie-down indicator parallel to the center line of the aircraft.

4. Attach bar 32 to member 16 at the hole in member 16 beneath the tie-down calibration corresponding to the load capacity of the aircraft tie-down fitting to be used.

5. Adjust member 16 to parallel the test cord, with the ends 36, 37 of the bar 32 resting flush on the top surface of base 10, i. e. on top of the grid.

6. Read the forward, or aft, and side load capacity on the grid lines under the tip of pointer 38; the forward load capacity of the tie-down is read on the calibration paralleling the center line of the aircraft i. e. on scale B; the side load capacity is read on the calibration paralleling the lateral axis of the aircraft i. e. on scale A, and the vertical load is read on scale C on vertical bar 32 at the reference line 43.

7. If the tie-down capacity—as obtained by step 6—is determined adequate, replace the test cord with a tie-down rope or cable. If the tie-down capacity is inadequate, use the tie-down load indicator to test rigging to other aircraft tie-down fittings or else, select a sufficient number of tie-downs to provide the desired tie-down capacity.

*Analysis of load capacity of existing tie-downs*

Very frequently, a practical method of satisfactorily tying down a specific load, or item of equipment, has been established by past practice or experience. To check accurately for directional security of these tie-downs for a given load, the mechanical load analyzer of the present invention can be used to determine the forward, aft, side and vertical capacities. This is done as follows:

1. Place the tie-down load indicator on the cargo compartment floor beside, or beneath, each tie-down rope in turn, with the hinge end of member 16 away from the cargo item. Be sure the bar 32 is positioned in the proper hole in member 16, and that one side of the tie-down load indicator, side 13, is parallel to the aircraft center line.

2. Adjust the bar 32 and member 16 until member 16 is parallel with the tie-down rope.

3. Read the forward load capacity on the base grid lines under the tip of pointer 32; the forward load capacity of the tie-down is given on the calibratioin scale B parallel to the aircraft center line. Similarly, the side load capacity is given on the calibration scale A parallel to the lateral axis of the aircraft, while the vertical load capacity is read on scale C on bar 32 at the reference line 43.

4. Using the tie-down load indicator to check on the load capacity, rig additional tie-downs or utilize other aircraft tie-down fittings, if necessary, to secure the desired total tie-down load capacity required in each direction, as determined in the manner described earlier in this specification.

In addition to its application in the determination of tie-down loads, the instrument of our invention can be advantageously employed in the solution of many other problems involving vectors, as will be apparent from a consideration of the following examples.

*Example 1*

Given the magnitude and directions of a space vector, it is required to determine the planar components thereof.

When using our instrument for the solution of this problem, it will be necessary and desirable to use a member 16 provided with a longitudinal slot, as related above. Briefly, the procedure is as follows:

(a) The guide pin 34 is adjusted in position on the member 16 at a point corresponding with the given magnitude of the vector, as read on scale D.

(b) The member 16 is then adjusted in position about the vertical pivot 24 and the horizontal pivot 28, until the given directions read on the protractors 30, 31, respectively.

(c) Keeping the member 16 fixed in its adjusted position and with the thumbpiece 41 loosened, the bar 32 is guided vertically on the pin 34 until the ends 36, 37 rest on top of the base or grid 10. This movement is permitted by the sliding fit between the flat sides 40 of the shank of the pin 34 and flat sides of the slot 33. Thereupon, the thumbpiece is rotated to firmly hold the member 16 and bar 32 in this final adjusted position over the grid.

(d) The vertical component of the space vector is given on scale C by the position of the reference line 43, while the lateral and longitudinal components can be obtained from the position of the pointer 38 on the base or grid 10.

*Example 2*

Given the planar components—i. e. lateral, longitudinal and vertical—of a space vector, it is required to determine the magnitude and directions of the space vector.

The procedure is as follows, again using a member 16 with a longitudinal slot therein:

(a) Loosening the thumbpiece 41, the member 16 and the associated bar 32 are adjusted in position on the base or grid 10, with the bar 32 in a position perpendicular to the top surface of the base and with the position of the tip of the pointer 38 coinciding with the intersection on the grid of the lines corresponding to the given lateral and longitudinal components.

(b) Keeping the bar 32 fixed in this position, and with the thumbpiece 41 still loosened, the member 16 is pivotally adjusted in position in a vertical plane about hinge 28 until the reference line 43 on the pin 34, which is guided by the slots of both the bar 32 and member 16, coincides with the given value of the vertical component of the vector. Thereupon, the instrument is locked in this position by tightening the thumbpiece 41.

(c) The magnitude of the vector is read off on scale D on member 16, opposite the position of the center of pin 34, and the directions of the vector are given by the position of the reference lines 22, 31' on the protractors 30, 31, respectively.

As will be apparent from the foregoing description of the device and examples of its use, we have provided a simple instrument which is capable of solving complex problems involving space vectors in a convenient and rapid manner. Its use does not require the services of skilled or specially trained personnel. The construction shown in the drawings illustrates an important practical embodiment of the invention. However, as indicated, the construction of our device is susceptible of modifications obvious to those skilled in the art and which are within the scope of the invention. For example, where great accuracy of readings is desired, both members 16 and 32 can be fitted with screw adjusted vernier scales.

We claim:

1. A direct reading instrument for determining the components of a space vector, comprising a base provided with a flat top surface, a pivoted straight edge member mounted on said base and adapted to pivot about intersecting axes which are respectively parallel and perpendicular to said top surface, and a straight edge bar adjustably mounted on said pivoted member, said member and said bar being movable over said top surface and said bar remaining perpendicular to said top surface during said movement but being otherwise unconstrained in its movement; the said top surface being provided on two adjacent sides thereof with a series of graduations having a common zero point which coincides with the said perpendicular pivotal axis of the pivoted member, said series of graduations being along lines at right angles to each other, and the pivoted member carrying a series of graduation marks and being provided with means for guiding the movement of the bar.

2. An instrument, according to claim 1, wherein the bar carries a series of graduations.

3. An instrument, according to claim 1, in which the vertical bar is provided with a slot, said bar terminating at its lower end in a pointer the tip of which lies on a line passing through the center line of the slot, and wherein the guiding means comprise a pin carried by the pivoted member, said pin passing through the slot for guiding the movement of said bar over the top surface of the base.

4. An instrument according to claim 1, in which the top surface is provided with two series of parallel lines respectively corresponding to the said two series of graduations on the adjacent sides, the lines of one series being at right angles to the lines of the other series and intersecting each other to form a grid.

M. STROUKOFF.
JAMES E. BARTFIELD.

REFERENCES CITED

The following references are of record in the file of this patent:

UNITED STATES PATENTS

| Number | Name | Date |
|---|---|---|
| 200,060 | Hitt | Feb. 5, 1878 |
| 838,365 | Wall | Dec. 11, 1906 |
| 945,684 | Blair | Jan. 4, 1910 |
| 1,043,605 | Kendrick | Nov. 5, 1912 |
| 2,198,948 | Park | Apr. 30, 1940 |

FOREIGN PATENTS

| Number | Country | Date |
|---|---|---|
| 117,747 | Great Britain | Aug. 1, 1918 |
| 344,256 | Germany | Nov. 21, 1921 |
| 796,304 | France | Jan. 22, 1936 |
| 908,612 | France | Oct. 1, 1945 |